Patented Feb. 19, 1935

1,991,755

UNITED STATES PATENT OFFICE 1,991,755

WATERPROOF COMPOSITION FOR FLOORING AND THE LIKE

Harold L. Levin, Nutley, N. J., assignor, by mesne assignments, to The Patent and Licensing Corporation, New York, N. Y., a corporation of Massachusetts No Drawing. Application December 31, 1930, Serial No. 505,979

6 Claims. (Cl. 106—31)

This invention relates to improvements in compositions adapted for use in the production of monolithic installations and is particularly concerned with improvements in compositions adapted to be spread upon a suitable foundation for the production of waterproof mastic type floorings or the like.

Compositions heretofore employed for this purpose have comprised mixtures made up of certain proportions of a hydraulic cementitious ingredient, mineral aggregate, and a waterproof binder in the form of an aqueous dispersion to produce a wet or moist composition which could be troweled in place. The ingredients of these compositions are generally so proportioned as to permit the composition, upon application, to attain its initial set by virtue of the hydration, or other chemical formation, a crystalline structure from the cementitious ingredient, and hence these compositions require a curing period of up to thirty days in order to attain maximum structural strength. When compositions of this kind are applied as floorings, there is considerable tendency of the floor to crack due to mechanical stresses induced during the setting and curing period. Further, it is necessary that these coatings be applied in a substantial thickness in order to provide proper mechanical strength.

Cementitious type products of the character set forth must be applied over a relatively static, rigid foundation since any movement of the foundation cannot be absorbed by the rigid cementitious structure without cracking. Therefore, the use of these products has been confined to application over a rigid or reenforced base.

It will be understood that these compositions are of a character in which initially, the set structure is crystalline in nature and comparable to a weak cement structure, in which the bitumen is present more or less as a filler until the crystalline structure becomes broken down. The bitumen then functions to impart cohesive and binding qualities to the broken down cement aggregate composition and the structure then takes on the form of a bituminous mastic composition. Hence, in order that this action may be induced and an integral and coherent structure may be maintained, it is necessary that the finished structure be subjected to the action of heavy and/or continuous traffic, to offer the kneading action necessary for producing the unitary and mastic properties of the structure.

In the practical application of these cement-containing compositions, it has heretofore been the practice to ship the waterproof binder in dispersed form to the job and there effect admixture thereof with the desired quantities of hydraulic cement and mineral aggregate according to the desired formula. The results obtained have accordingly been dependent in large measure upon the types and grades of cement and aggregate employed by the individual operator or consumer, and despite the fact that engineering specifications for these ingredients are followed, uniform results have not generally been obtainable.

Still further, compositions of this character have not been susceptible to satisfactory use in locations where acids, or acid fumes are present, because of the reactive nature of the composition due to the presence therein of the hydraulic cement and/or the aggregate.

The principal object of the present invention is to provide a composition which can be compounded at a central point to contain all of the ingredients necessary for the production of a mastic producing structure, free from the difficulties heretofore outlined.

Another object of the invention is to provide a pre-mixed plastic composition containing the required ingredients in selected proportions such that the composition may be shipped in that form to the point of use and there applied over a suitable foundation in rapid manner as by trowelling or the like.

Still another object of the invention is to provide a pre-mixed composition of the character set forth in which the nature and proportions of the ingredients are entirely within the control of the manufacturer and not left to the haphazard discretion of the consumer. A further object is to provide a pre-mixed composition of the character set forth which can be rapidly spread or otherwise applied in a layer of desired thickness and which upon dehydration, will at once, and without requiring a curing period, exhibit mastic properties capable of maintaining the unitary and coherent qualities of the structure without requiring application of continuous and/or heavy traffic loads; which will not show any tendency towards the formation of cracks due to internal stresses set up in the structure; and which can be rendered resistant to the action of acid or acid vapors by suitable choice of ingredients.

Briefly stated, the objects of the invention are accomplished by the provision of a composition in which an aqueous emulsion of bituminous material is compounded with fine mineral aggregate and mineral dust, the character and relative proportions of the aggregate and mineral dust being regulated in such manner that the mineral dust fills the voids in the mineral aggregate thereby to insure mechanical stability in the product after it has dried in a layer, and the particles of dispersed bitumen in the composition serve to fill the voids in the composite aggregate to insure compactness in the finished structure and to serve as a binding medium for knitting together the particles of the composite mineral aggregate.

In carrying out my invention, I may employ any suitable dispersion of bituminous material, such, for example, as a dispersion of asphalt of 100 to 200° F. melting point, comprising 55 to 60% of asphalt, 35 to 40% of water and a small quantity of a suitable dispersing agent such as colloidal clay, bentonite, casein, soap or the like. As will be understood by those skilled in the art, it is essential that the dispersion be one which is of such degree of stability as to permit incorporation of finely divided inert mineral matter without causing the dispersion to break or become unduly flocculated. Preferably also, the dispersion is fibrated, that is, will contain 3 to 4% of wool or equivalent fibre.

In one embodiment of the invention, one volume of a dispersion of a 150° melt point steam refined asphalt may be mixed with two and one-half volumes of sand, preferably a sharp, silica sand of such grading as to pass through a screen of 20 mesh and be retained on a screen of 80 mesh, and with three-quarters of a volume of a silica flour such as silex, or similar siliceous powder of 100 to 200 mesh. In compounding the dispersion with ingredients as stated, the siliceous sand or other mineral aggregate may first be added to the fibrated dispersion in a suitable mixer provided with agitating means and thereupon the silex may be incorporated in the mixture of dispersion and sand. Water is then added, if necessary, to give the desired consistency as measured by a standard cone slump-testing apparatus. The preferred reading as taken on this device is in the range of 2" to 4" slump.

The composition as thus produced may be transported in this condition to the point of use where it will be spread on the foundation in layers of any desired thickness ranging from $\frac{1}{16}$ inch to 1 inch, although it has been found that a ¼ inch thickness is optimum for most commercial purposes. Preferably the composition will be spread over the foundation by means of a trowel and if desired, a suitable priming coat of asphalt dispersion may be interposed between the surface of the foundation and the layer of the plastic composition forming the subject of my present invention, in order to improve the cohesion between the foundation and the structure formed from this layer.

The composition thus applied in the form of a layer will set on dehydration to a resilient structure with a hard wearing surface, the structure being water- air- and moisture-tight. When siliceous mineral aggregate and fines are employed, the structure will be entirely impervious to the action of acids or acid vapors. Where this latter property is desired, any other suitable acid-resistant aggregate, as for example, coke breeze, may be substituted for the silica sand, and any other acid resistant fines, as for example, coal fines or dust may be employed in lieu of the silex, especially where resistance to hydrofluoric acid is desired. Where, on the other hand, increased resiliency and elasticity are desired, comminuted rubber, and/or cork may be used as the aggregate and rubber dust or cork dust may be employed as the fines for filling the aggregate voids.

While I have above indicated one illustration of proportions of the ingredients which I have found suitable, it will be understood that considerable variation may be made in these proportions within the purview of my invention, so long as the voids in the aggregate are substantially completely filled by the fines and a coherent, impervious mass results; my observations indicate that satisfactory results may be obtained with mixtures made up of ¾ to 1.5 parts by volume of the bituminous dispersions, 2 to 3 parts by volume of the aggregate, and one-half to one part by volume of the fines. Where acid-resistance is not essential in the finished structure, the siliceous sand may be substituted by any other form of inert mineral aggregate of substantially the grade of size above indicated and likewise, the silex may be replaced by a mineral dust, as for example, slate dust or other equivalent fines of about 100 to 150 mesh. Where colored structures are desired, suitable inert finely divided pigments may be substituted in whole or in part for the mineral dust.

The compositions as herein described may be employed as an industrial flooring, ship decking, insulation protection, recreation court, car flooring, passenger platform and the like.

I claim as my invention:

1. A premixed composition for application as a mastic flooring or the like comprising a uniform mixture of fibrated stable bituminous dispersion, aggregate of 20 to 80 mesh and inert finely divided material of 100 to 200 mesh, the volume of aggregate in the mix being substantially in excess of the volume of dispersion, and the finely divided material being present in quantities sufficient to fill the voids in the aggregate.

2. A premixed composition for application as a mastic flooring or the like comprising a uniform mixture of fibrated stable bituminous dispersion, acid resistant aggregate of 20 to 80 mesh, and acid resistant finely divided material of 100 to 200 mesh, the volume of aggregate in the mix being substantially in excess of the volume of dispersion, and the finely divided material being present in quantity sufficient to fill the voids in the aggregate.

3. A premixed composition for application as a mastic flooring or the like comprising a uniform mixture of fibrated stable bituminous dispersion, siliceous aggregate of 20 to 80 mesh and siliceous finely divided material of 100 to 200 mesh, the volume of aggregate in the mix being substantially in excess of the volume of dispersion, and the finely divided material being present in quantity sufficient to fill the voids in the aggregate.

4. A premixed composition for application as a mastic flooring or the like comprising a uniform mixture of fibrated stable bituminous dispersion, silica sand of 20 to 80 mesh and siliceous powder of 100 to 200 mesh, the volume of silica sand in the mix being substantially in excess of the volume of dispersion and the siliceous powder being present in quantity sufficient to fill the voids in the silica sand.

5. A premixed composition for application as a mastic flooring or the like comprising a uniform mixture of fibrated stable bituminous dispersion, aggregate of 20 to 80 mesh, and inert finely divided material of 100 to 200 mesh, the said ingredients being present in substantially the following proportions by volume: three-fourths to one and one-half parts of the dispersion, two to three parts of the aggregate and one-half to one part of the fines.

6. A premixed composition for application as a mastic flooring or the like comprising a uniform mixture of fibrated stable bituminous dispersion, acid resistant aggregate of 20 to 80 mesh and acid resistant finely divided material of 100 to 200 mesh, the said ingredients being present in substantially the following proportions by volume: three-fourths to one and one-half parts of the dispersion, two to three parts of the acid resistant aggregate and one-half to one part of the acid resistant finely divided material.

HAROLD L. LEVIN.